May 23, 1939.  J. D. RYDER  2,159,181
ELECTRIC CONTROL SYSTEM
Filed April 19, 1933  2 Sheets—Sheet 1

INVENTOR
John D. Ryder
BY
Raymond D. Junkins
ATTORNEY

May 23, 1939.   J. D. RYDER   2,159,181
ELECTRIC CONTROL SYSTEM
Filed April 19, 1933   2 Sheets-Sheet 2

INVENTOR
John D. Ryder
BY
Raymond D. Jenkins.
ATTORNEY

Patented May 23, 1939

2,159,181

UNITED STATES PATENT OFFICE 2,159,181

ELECTRIC CONTROL SYSTEM

John D. Ryder, Cleveland, Ohio, assignor to Bailey Meter Company, a corporation of Delaware Application April 19, 1933, Serial No. 666,851

12 Claims. (Cl. 250—41.5)

My invention relates to improvements in electric control systems and in particular to an improved electrical circuit including a device susceptible to the relative values of variables, or to the relation between the value of a variable and a predetermined value, for indicating and/or controlling the value of such variable or variables.

The variable may be in the nature of a quantity, condition, relation, etc., such, for example, as pressure, temperature, flow, speed, or any physical, chemical, thermal, electrical, hydraulic or other variable or relation of variables.

In my improved electric circuit, I have primarily a plurality of loop circuits, in one or more of which will be a varying current, electromotive force, or resistance, varying with the value of a variable. A third loop circuit comprises a portion of each of the said plurality of loops and also a sensitive device, such as a standard galvanometer, susceptible to differences in voltage drops across the portion of each of the plurality of loops which is included in the third or galvanometer loop. Now the circuit comprising a galvanometer susceptible to difference in voltage drops might be applied to anything which would cause a change in voltage, current and/or resistance, such, for example, as thermocouples, variable resistances, photo-voltaic cells, etc.

I have, then, a sensitive device, such as the galvanometer, susceptible to differences in voltage drops, where each voltage drop is representative of the value of a variable. The galvanometer is desirably arranged to depart from a predetermined position upon an unbalance in voltage drops, and such departure of the galvanometer needle may initiate an action which may be utilized to balance the voltage drops and bring the galvanometer needle back to its predetermined balanced position; as well as simultaneously to effect a recording or indication of one or more of the variables and simultaneously control that which will change the value of one or more of the variables.

Figure 1:
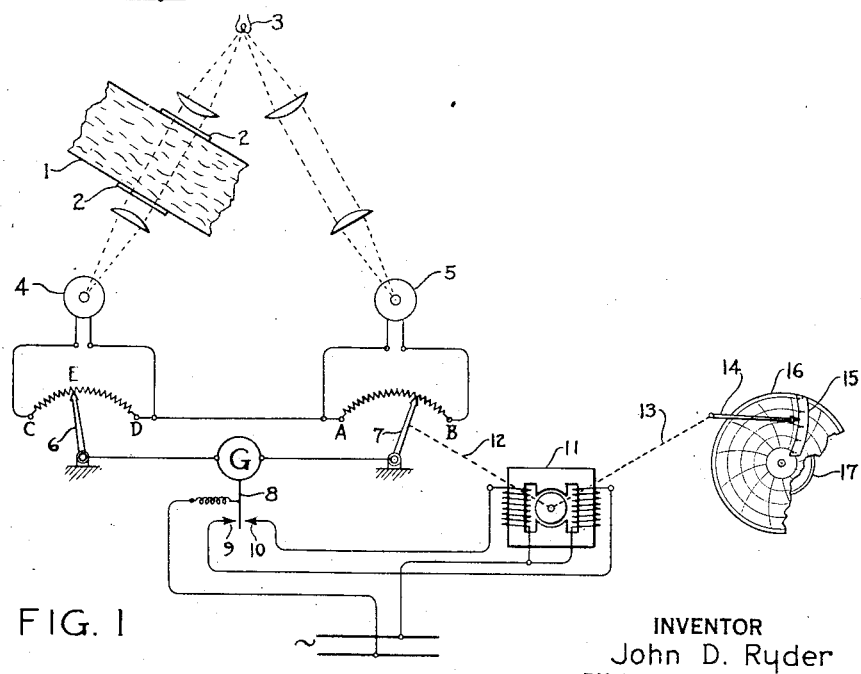
Fig. 1 represents in diagrammatic fashion, one embodiment of my invention utilizing photovoltaic cells and indicating the value of a variable.

Referring first to Fig. 1, I show at 1 a duct such as the uptake duct from a furnace, through which smoke or the gaseous products of combustion continually pass, and having glass or other transparent windows 2, on opposite sides of the duct and in line for the passage of light rays from a source 3. Such light rays are concentrated upon a photo-voltaic cell, such as the commercially known Weston Photronic Cell, indicated at 4, and wherein the light effective on the cell will vary primarily with the density of the smoke passing through the duct 1. The arrangement of Fig. 1 is primarily for the purpose of indicating and/or recording such smoke density.

A second photo-voltaic cell 5, of similar but not necessarily identical characteristics as the cell 4, also receives light from the source 3. Such photo-voltaic cells are known in the art and, responsive to light, may change their electromotive force, current, and/or resistance.

I show the cell 5 in a loop circuit including the resistance AB and the cell 4 in a similar loop circuit including the resistance CD. I further show a galvanometer or similar sensitive device G in a third loop circuit including a portion of the resistance AB and a portion of the resistance CD. In general, the galvanometer G is susceptible to the difference in voltage drops across the portion of each of the two resistances included in its circuit.

In the galvanometer circuit I show a pivoted contact arm 6 capable of being moved in contact along the resistance CD and a pivoted contact arm 7 capable of being moved in contact along the resistance AB. The two arms 6, 7 thus provide adjustable means for including in the galvanometer loop a greater or lesser proportion of each of the resistances CD, AB. When light falls upon the cells 4, 5, a current and electromotive force is produced in the respective loop circuits.

When calibrated with no smoke passing through the duct 1, and the arm 7 at some point, for example, B of the resistance AB, then the arm 6 will be at some point E of the resistance CD when the galvanometer G is in neutral or balanced position. The point E of contact for the arm 6 with the resistance CD is determined by moving the arm 6 until the galvanometer is in a balanced position, and such calibration takes care of initial differences in characteristics of the cells 4, 5, as well as such variations as may exist in the amount of light reaching the cells from the source 3, the amount and resistance of wire in the respective circuits, etc.

I show the galvanometer needle 8 capable of engaging the contact 9 or 10 as it moves in one direction or the other from a balanced or neutral position. The needle and contacts are wired to a motor 11, such as a self-starting synchronous motor having opposing fields connected in an alternating current circuit whereby if the needle 8 engages the contact 9, one of the fields of the motor 11 will be energized for rotation in one direction and if the needle 8 engages the contact 10 it will effect rotation of the motor 11 in the opposite direction. The motor is connected through any suitable known mechanical means, such as gears, indicated by a dotted line 12, with the contact arm 7 for positioning the same in one direction or the other around its pivot. The motor 11 is also connected in suitable manner through proper speed reduction as indicated at 13, with an arm 14 comprising a combination indicator and marking pen adapted to be moved relative to an index 15 and a recording chart 16, the latter continuously moved by a time means such as a clock 17.

In operation, the system is calibrated by moving the contact arm 6 along the resistance CD to some point E, such that the portion ED of the resistance CD will have a voltage drop equal to that across the resistance AB when the contact arm 7 is at B. This with the light source 3 effective upon the cells 4, 5 and with no smoke passing through the duct 1. The motor 11 will be in such a position that the contact arm 7 is at B and the indicating arm 14 at zero on the index 15 and the recording chart 16. Such, of course, indicates no smoke density through the duct 1.

Now when the smoke or gases containing any solid particles pass through the duct 1, changing the amount of light reaching the cell 4, then the current and/or electromotive force output of the cell 4 will be varied, thus changing the voltage drop across the resistance ED in a direction to decrease the voltage drop thereacross, and through the unbalance in voltage drops between the resistance portion ED and the resistance AB in the galvanometer circuit, the galvanometer needle 8 will swing in one direction until it engages one of the contacts 9, 10, resulting in energization of the motor 11 in a direction to position the contact arm 7 along the resistance AB to decrease the portion included in the galvanometer circuit, until the voltage drop across that portion so included equals or balances that resistance drop through ED and the galvanometer needle, susceptible to the balance or unbalance in voltage drops, will return to its neutral non-contacting position. Such return will stop the motor 11 and correspondingly the travel of the arm 7. Further change in density of the smoke or gases passing through the duct 1 will result in an unbalance of voltages between the two portions of resistance included in the galvanometer circuit, whereby the needle 8 will swing in one direction or the other, depending upon whether the smoke density has increased or decreased, and correspondingly, the motor 11 will be energized for rotation in one direction or the other, moving or positioning the contact arm 7 in proper direction to balance the resistances and voltage drops therethrough and return the galvanometer needle to its neutral or non-contacting position.

Simultaneously with movement of the contact arm 7, is effected a positioning of the indicating arm 14 relative to the index 15 and the chart 16 to provide an indication of smoke density and a continuous record thereof. It will be seen that the less dense the smoke is, the greater amount of light will pass therethrough and reach the cell 4, and the closer to the point B will be the contact arm 7 and the closer to zero will be the indicator arm 14 relative to the index 15 and the chart 16. Conversely, as the density of the smoke increases, the arm 7 will move toward the point A and the indicator arm 14 will move toward maximum reading on the index 15 and on the chart 16.

One primary advantage of my invention comprises the arrangement wherein changes in light intensity of the source 3, due to changes in voltage, current, aging, or dust and dirt accumulation on the source, is ineffective or minimized as to effect upon the accuracy of the indication and recording of smoke density. The same light source is effective upon the cells 4, 5 so that after the initial calibration, which takes into account variations in the cells proper as well as in the circuits thereof, there will be a continuous comparison of voltage drops to which the galvanometer is susceptible, and varied substantially entirely by changes in smoke density through the duct 1.

Figure 2:
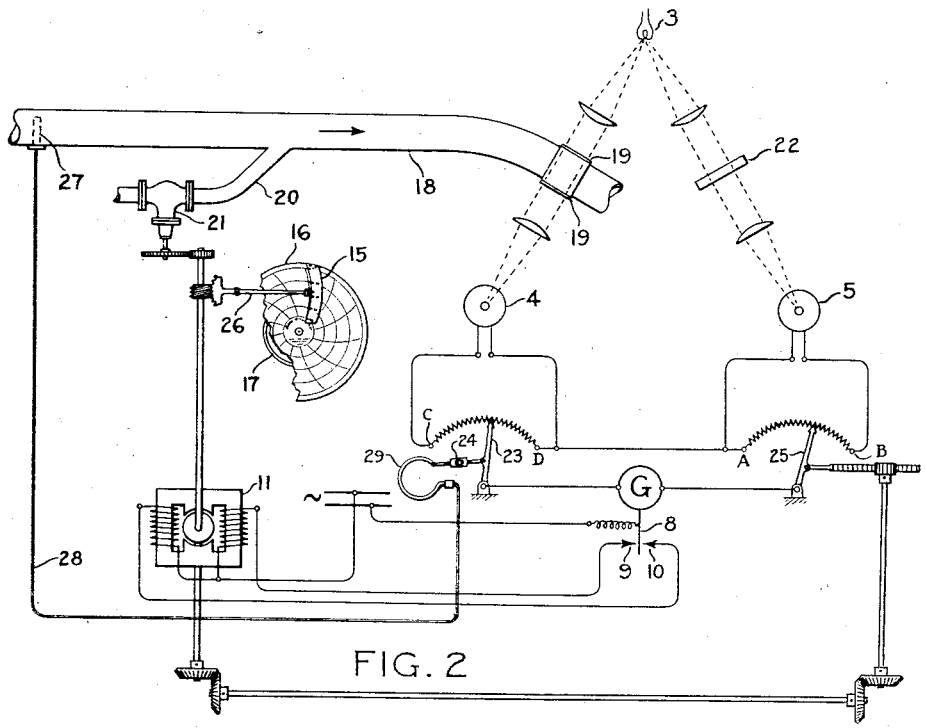
Fig. 2 illustrates in diagrammatic fashion, an embodiment similar to Fig. 1, but additionally controlling to maintain substantially uniform the value of the variable being measured.

In Fig. 2, I show a somewhat similar arrangement, except that herein I additionally control the value of the density through which the light from the source 3 passes to the cell 4, upon departure of such density from a predetermined value, and to maintain such value. I illustrate at 18 a conduit through which may be flowing, for example, a dye solution in the direction of the arrow. The conduit has at 19 glass or other transparent windows through which light from the source 3 may pass to the cell 4. Obviously the amount of light passing to the cell 4 will depend upon the density or light transmitting properties of the fluid flowing past the windows 19. I show at 20 a pipe joining the conduit 18 and through which dye or similar material may be fed to the fluid under observation to vary the density or color thereof and such addition is controlled through the positioning of a valve 21 in the pipe 20.

Such cells as the photo-voltaic cells 4, 5 are sensitive to color as well as to light, and the arrangement of Fig. 2 is adapted to work from a comparison of color or wave length of light relative to a standard such as a color screen 22, positioned in the path of the light from the source 3 to the cell 5.

After initial calibration as described for Fig. 1, the arm 23, adjusted by the turnbuckle 24, will be in a position to take care of all discrepancies in the circuit when the color of the fluid passing through the conduit 18 is the same as the color screen 22. Preferably, when this condition exists, the arm 25 will be at some point near the middle of the resistance AB and the indicator 26 opposite a graduation of the index 15 and the chart 16, denoting similarity between the two colors, namely that of the fluid passing through the conduit 18 and that of the color screen 22, and preferably such line or graduation to be, for example, at the center of the index 15 and the center of the chart graduations 16.

Thereafter, upon departure of color of the fluid passing between the windows 19 in one direction or the other from coincidence with the color of the screen 22, the galvanometer needle will depart in one direction or the other and engage either the contact 9 or the contact 10 for actuating the motor 11 in proper direction to position the valve 21, and admit dye solution at a greater or lesser rate to the conduit 18 for bringing the color of the solution passing therethrough back to the predetermined value.

Simultaneously with the positioning of the valve 21 the motor 11 causes a positioning of the indicator arm 26 and of the contact arm 25 to balance the galvanometer circuit. The arrangement being such that the color of the fluid passing the windows 19 is continuously controlled to be in coincidence with the color of the color screen 22. The index 15 and chart 16 may be calibrated in desirable units of valve position, wave length, color, or in percentage departure from predetermined coincidence, etc.

I show further in the arrangement, means sensitive to a variable of the flowing fluid for continuously and automatically adjusting the position of the arm 23 relative to the resistance CD. Such means I have illustrated as a gas-filled thermometer system comprising a bulb 27, connected by the capillary 28 with a Bourdon tube 29, whose free end is adapted to position the contact arm 23 along the resistance CD upon change in temperature of the flowing fluid effective upon the bulb 27. I contemplate by this arrangement a compensation to the addition of coloring matter through the pipe 20 such as may be necessary for changes in temperature of the fluid to which the coloring matter is added, when such changes in temperature may result in different color properties or color absorption properties of the fluid. Broadly I indicate that any variable that would affect the primary control of the light passing quality of the fluid between the windows 19, may be effective to position the compensating arm 23.

Figure 3:
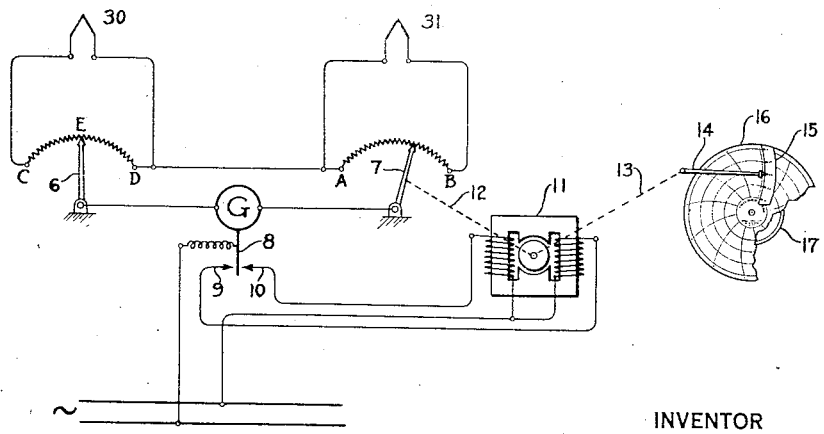
Fig. 3 represents diagrammatically a further embodiment of the invention utilizing thermoelectric devices such as thermocouples.

The circuit described, wherein the galvanometer is susceptible to difference in voltage drops, may be applied in other arrangement wherein variables will cause a change in voltages, current, and/or resistances, such for example, as thermocouples in place of the photo-voltaic cells, previously described. I show in Fig. 3 an arrangement for comparing two temperatures to which thermocouples 30 and 31 are respectively sensitive and specifically for indicating and/or recording the departure of the temperature to which the thermocouple 30 is sensitive from the temperature to which the thermocouple 31 is sensitive. The circuit arrangement is similar to that of Figs. 1 and 2 and the galvanometer G is susceptible to the difference in voltage drops between the portion of the resistances of the thermocouple circuit included in the galvanometer circuit. Upon initial calibration, the arm 6 is positioned along the resistance CD to some point E, and the arm 7 along the resistance AB so that, regardless of the specific or absolute temperature of the thermocouples 30, 31, the galvanometer is in balance and its arm 8 at a neutral non-contacting position when the temperature at the thermocouples 30, 31 are the same. Now upon departure of the temperature at the thermocouple 30 from a value the same as that to which the thermocouple 31 is sensitive, in either direction, the difference in voltage drop between the portions of the resistances AB and CD included in the galvanometer circuit will cause the galvanometer to be unbalanced and the arm 8 to engage either the contact 9 or the contact 10. This will, as previously described, cause the motor 11 to be rotated in one direction or the other and through the necessary gears or linkage 12, 13, will position the contact arm 7 along the resistance AB in a direction and amount to again balance the galvanometer circuit, and simultaneously, the indicator arm 14 relative to the index 15 and chart 16, to show departure of the temperature to which the thermocouple 30 is sensitive, in either direction from coincidence with the temperature to which the thermocouple 31 is sensitive.

Should, however, the temperature at both 30 or 31 increase or decrease together and in the same amount, there will be no unbalance of the galvanometer circuit and no change in position of the contact arm 7 or the indicator arm 14. The indicator arm 14 will continue to show, relative to the index 15 and the chart 16, that the two temperatures are the same and in coincidence. The indicator will depart from such showing only when the temperature so measured departs from coincidence. If the index 15 and chart 16 are calibrated in degrees temperature, then the arrangement may be such that the arm 14 will continuously indicate actual temperature to which the thermocouple 30 is sensitive so long as the temperature to which the thermocouple 31 remains constant.

Figure 4:
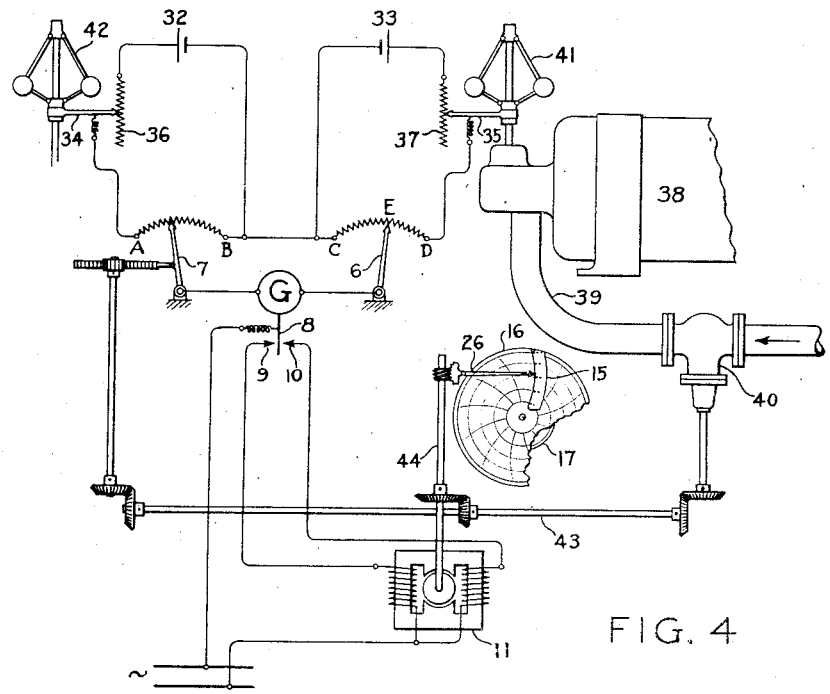
Fig. 4 represents somewhat diagrammatically another embodiment of the invention for comparing voltage drops effected by means of variable resistances.

In Fig. 4 I show an arrangement wherein current and/or voltage is supplied to the two loop circuits by batteries 32, 33, respectively, and the value of the current and/or voltage in the respective circuits is varied through the positioning of contact arms 34, 35 along slide wire resistances 36, 37, respectively. The arrangement in general provides a means for comparing variables such as speeds of rotation and the controlling of one such speed to keep it in synchronism with the other, regardless of the absolute value of the speed or speeds.

I show at 38 a steam turbine to which steam is fed through a conduit 39 and whose rate of steam supply is adjusted through the positioning of a valve 40 in the conduit 39. The turbine is provided with a fly-ball governor 41 arranged so that upon variation in speed and as the fly-balls travel at a greater or lesser radius, the contact arm 35 will be positioned vertically upward or downward relative to the slide wire resistance 37. The position of the arm 35 will then be an indication of speed of the turbine 38.

The arm 34 is adapted to be positioned vertically relative to the slide wire resistance 36, by a similar arrangement of fly-ball governor 42 which is responsive to the speed of a turbine or other rotating machine with which the speed of the turbine 38 is to be kept in synchronism. It is immaterial what the absolute value of speeds are or as to whether the speeds of the two machines are the same or not, but the arrangement contemplates only that the two speeds be kept in synchronism or proportional the one to the other. After initial calibration wherein the arm 6 is moved along the resistance CD to some point E and the galvanometer is in neutral or non-contacting position when the speed of the two machines is in desired proportionality, the indicator arm 26 will be at some designated point on the index 15 and relative to the chart 16, denoting coincidence or desired proportionality between the speeds.

Now upon departure in speed of the machine 38 from that whose speed is represented by the fly-ball governor 42, the voltage drops will become unbalanced and the galvanometer needle 8 depart in one direction or the other from a non-contacting position and engage either the contact 9 or the contact 10. This, as previously described, causes an energization of the motor 11 to position the arm 7 and the indicator arm 26 by means of proper gearing 44 and simultaneously through gearing 43, will position the control valve 40 to bring the speed of the machine 38 into synchronism.

It will be seen that while I have described certain preferred arrangements and embodiments of my invention, I am not to be limited thereby except as to the claims in view of prior art. The arrangement comprises in general a galvanometer or other sensitive device of similar nature, susceptible to voltage drops between two portions of the circuit in which the galvanometer is included. The voltage drop through each of these portions may be representative of the value of a variable, such as temperature, pressure, speed, quantity, rate of flow, etc., and may be accomplished by variation in current, potential and/or in resistance.

While I have illustrated various means and ways of changing the voltage drop across the portions of the resistances included in the galvanometer circuit, it is not necessary that I be restricted merely to those which I have shown to illustrate and describe. I contemplate broadly that the galvanometer is susceptible to a difference between voltage drops which may be caused in any desired manner and representative of the value or relation of variables which may be of a physical, chemical, electrical, hydraulic, or other nature, or may be varied by hand or by the positioning of any object.

I may utilize the comparison of voltage drops or other effects in portions of the galvanometer circuit to record departure from unity or other proportional relations between the said voltage drops or in absolute value, or may utilize such departure or value in re-balancing the galvanometer circuit or in the control of one or more of the variables.

What I claim as new and desire to secure by Letters Patent of the United States, is:

1. In combination, a pair of similar electric circuits, a pair of thermocouples sensitive to varying temperature conditions and connected one in each circuit, a resistance in each circuit, a third circuit including a variable portion of each of said resistances, a galvanometer in said third circuit susceptible to the differential in voltage drops across the portion of the resistances in its circuit, and means under the control of said galvanometer adapted to re-balance said voltage drops after a departure from balance.

2. In combination, a pair of similar electric circuits, a pair of thermocouples sensitive to varying temperature conditions and connected one in each circuit, a resistance in each circuit, a third circuit including a variable portion of each of said resistances, a galvanometer in said third circuit susceptible to the differential in voltage drops across the portion of the resistances in its circuit, means under the control of said galvanometer adapted to re-balance said voltage drops after a departure from balance, and means positioned with said last-named means for advising the instantaneous difference between the temperature conditions to which the thermocouples are sensitive.

3. In combination, a first electric circuit including a resistance, a second electric circuit including a resistance, a third electric circuit including a galvanometer and a variable portion of each of said resistances, means under the control of a variable for varying in step therewith the voltage drop through the resistance of the first electric circuit, means under the control of a variable to be compared to the first variable for varying in step therewith the voltage drop through the resistance of the second electric circuit, the galvanometer susceptible to the differential in voltage drops across said portions whereby the galvanometer is in balance when the value of said two variables is in desired proportionality, and means under the control of said galvanometer when it departs from balance for varying the portion of the second resistance which is included in the galvanometer circuit.

4. A galvanometer circuit including in combination, a galvanometer and a plurality of variable resistances, said galvanometer sensitive to unbalance of voltage drops across said resistances, means for causing a voltage drop across one of the resistances representative of the value of a variable, means for causing a voltage drop across another of the resistances representative of the value of a second variable whose instantaneous value is to be compared to that of the first variable, and means under the control of said galvanometer for re-balancing the galvanometer after it has been unbalanced by a departure of said variables from desired proportionality.

5. In combination, a pair of separate electric circuits each including a photo-voltaic cell and a resistance, means for varying the currents produced by said cells, a circuit associated with said first-named circuits including a galvanometer arranged to compare voltage drops through portions of said resistances, and means under the control of said galvanometer for varying one of said portions to maintain said voltage drops equal.

6. In combination, a pair of separate electric circuits each including a photo-voltaic cell and a slide wire resistance, means for varying the currents produced by said cells, a movable contact arm engaging each of said slide wire resistances, a circuit associated with said first-named circuits and said contact arms and including a galvanometer arranged to compare the voltage drops across portions of said resistances determined by the position of said contact arms, and means under the control of said galvanometer for moving one of said contact arms along its associated slide wire.

7. In combination, a pair of separate electric circuits each including a resistance and means for producing a variable voltage drop across the resistances, a movable contact arm engaging each of said resistances, a galvanometer, a connection between said galvanometer and each of said contact arms, the galvanometer arranged to compare voltage drops across portions of said resistances determined by the position of said contact arms, and means under the control of said galvanometer for moving one of said contact arms along its associated resistance, to maintain said voltage drops equal.

8. In combination, a pair of similar electric circuits, a photo-voltaic cell in each circuit, a resistance in each circuit, a light source effective upon both cells, a fluid of varying light obstructing density in the light path to one of the cells, a third circuit including a variable portion of each of said resistances, a galvanometer in said third circuit susceptible to the differential in voltage drops across the portion of the resistances in its circuit, a self-starting motor having opposed fields, means controlled by said galvanometer for selectively energizing one or the other of said fields in accordance with variations in fluid density, and an operative connection between said motor and one of said resistances for varying the voltage drop of one of the resistances effective upon the galvanometer to balance same after displacement from balance due to variations in fluid density.

9. In a fluid density indicator and/or recorder, a pair of similar electric circuits each including a resistance and a photo-voltaic cell, a single light source effective on both cells, a fluid of varying light obstructing density in the light path to one of the cells, a third circuit including a variable portion of each of said resistances and a galvanometer having a movable member adapted to deflect from a neutral position in accordance with the difference in voltage drops across the said variable portions of said resistances, and means for maintaining said voltage drops equal under the control of said movable member comprising a self-starting motor having opposed fields for varying the portion of one of said resistances in circuit with said galvanometer.

10. In combination, a pair of separate electric circuits, each including a resistance and means for producing a variable voltage drop across the resistances, a contact arm engaging each of said resistances, a reversible motor for operating one of said contact arms, a galvanometer sensitive to the voltage drop across portions of said resistances determined by the positions of said contact arms, and contact means actuated by said galvanometer for controlling said motor to maintain said voltage drops equal.

11. In combination, an electric circuit comprising a slide wire resistance and a photo-voltaic cell, a second circuit comprising a slide wire resistance and a photo-voltaic cell, a source of light for energizing said cells, a fluid of varying light obstructing density in the light path to one of the cells, a movable contact arm engaging each of said slide wire resistances, means for determining the difference in voltage drops through portions of said resistances determined by the positions of said contact arms relative to their associated slide wires comprising a galvanometer having a movable member adapted to deflect from a neutral position in accordance with changes in said difference from a predetermined value, a reversible motor having opposed fields for moving the contact arm associated with the slide wire resistance in said second named circuit, and contact means actuated by said movable member when deflected from a neutral position to control said motor to maintain said difference at the predetermined value.

12. In combination, a pair of separate electric circuits each including a photo-voltaic cell and a resistance, light means for varying the currents produced by said cells, a circuit associated with said first-named circuits including a galvanometer arranged to compare voltage drops through portions of said resistances, and means under the control of said galvanometer for varying one of said portions.

JOHN D. RYDER.